B. S. Church,
Piston Meter,
No. 33,475. Patented Oct. 15, 1861.
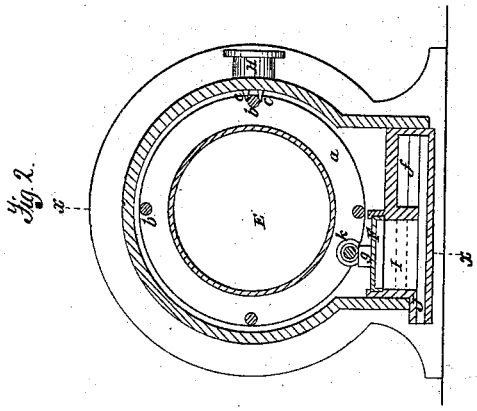
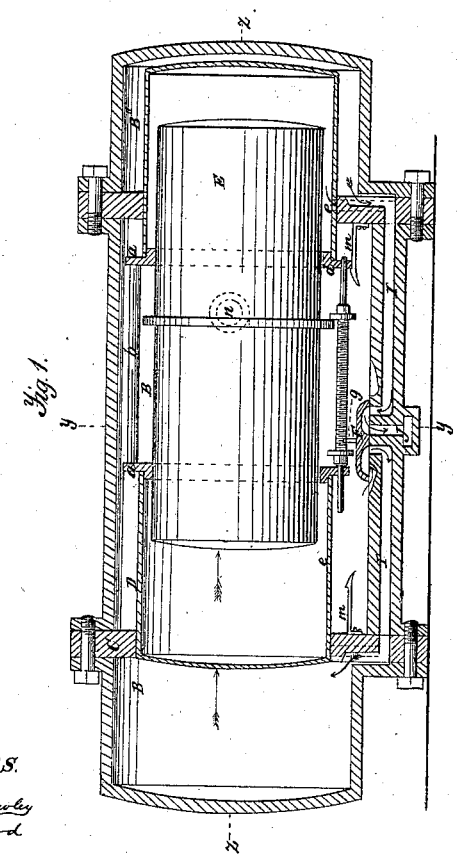
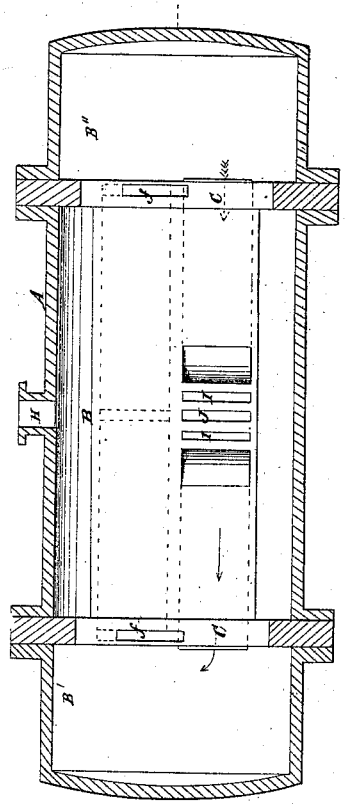
Witnesses.
Richardson Gawley
James Laird
Inventor:
Benj. S. Church.

UNITED STATES PATENT OFFICE.

BENJAMIN S. CHURCH, OF NEW YORK, N. Y.

IMPROVEMENT IN WATER-METERS.

Specification forming part of Letters Patent No. 33,475, dated October 15, 1861.

*To all whom it may concern:*

Be it known that I, BENJAMIN S. CHURCH, of the city, county, and State of New York, have invented a new and Improved Water-Meter; and I do hereby declare the following to be a full, clear, and exact description of the same, reference being had to the accompanying drawings, making a part of this specification, in which—

Figure 1 represents my improved meter by a longitudinal section taken at the line $x\ x$, Fig. 2. Fig. 2 is a transverse section of the same, taken at the line $y\ y$ of Fig. 1; Fig. 3, a horizontal section of the same, taken at the line $z\ z$ of Fig. 1.

Similar letters of reference indicate corresponding parts in the several figures.

This invention consists in arranging within a cylindrical case two plungers fitted to work one within and independent of the other in such a manner as to leave a passage for the water to flow in and out of the meter in all positions of the plungers and to prevent any water from passing through the meter without being measured.

To enable others skilled in the art to make and use my invention, I will proceed to describe its construction and operation.

A represents the cylindrical case of the meter divided into three compartments B B' B'' by the disk-rings C C, which are bolted between the flanged portions of the cylinder and through which the hollow plunger D is fitted to work. The plunger D is composed of two cylinders furnished each with a flange $a$ at one end, which when placed in line a distance apart equal to the length of one of the cylinders are connected together by screw-rods $b\ b$. One of these rods is fitted to slide back and forth with the plunger between two guides $c\ c$, by which means the plunger is prevented from turning independent of the outer case of the meter.

E is also a plunger fitted to work within the plunger D through two rings or bushings $d\ d$, attached on the inner side of the plunger D in such a manner as to cause it to act as a cylinder for the plunger E, while it (E) actuates the sliding valve. The plunger E is furnished on its under side with two oblong openings $e\ e$, so arranged that at the end of each stroke one of them opens into one of the passages $f\ f$ in the disk-rings for an outlet, while the other opens into the central compartment or chamber B for an inlet to operate the plunger E.

F is a sliding valve furnished with a projection $g$ on its upper side and fitted to slide over the openings to regulate the outlet and inlet flow of water to and from the end compartments B' B'' of the meter. This valve is actuated by means of a flange $n$, formed on the outside and midway of the plunger E, which as the plunger moves back and forth in the plunger D at the end of each stroke strikes one of the tappets $k\ k$, causing the tappet on the opposite end of the rod to move the valve. The sliding rod G is attached to the plunger D and is moved by it to a suitable position for the flange on the plunger E to strike one of the tappets and thus move the valve. The tappets $k\ k$ are of disk form and screwed on the sliding rod, and by simply screwing them toward or from each other the meter may be adjusted to measure more or less within a certain limit, as it causes the plunger E to make a correspondingly lengthened or shortened stroke.

I I are water-passages, through which a communication between each of the end compartments B' B'' and middle compartments B is alternately formed by the sliding valve.

J is an outlet or discharge opening, which by means of the sliding valve communicates with one of the end compartments of the case while a communication is formed between the other end and middle compartment B.

H is the main pipe, through which the water passes into the meter, and I is the discharge.

The operation is as follows: The water first enters the middle compartment B through the pipe H. The pressure being in the direction of the radii, the plungers are not affected by it. It then passes under one side of the sliding valve, through one of the passages I into one of the end compartments B' B''. As it fills, the pressure against the end of the plunger D causes it to move in the opposite direction, at the same time forcing the water out of the compartment in the opposite end of the case through one of the passages I into and out of the discharge J. When the plunger E has finished its stroke, it brings one of the oblong openings in the hollow plunger D immediately over one of the passages $f$, which allows the water in the end of the plunger D to pass out while the opposite end is being filled, and the plunger thereby forced in the opposite direction. As the plunger E completes its stroke, the flange $n$ comes in contact with and moves one of the tappets, causing the other on the opposite end of the rod to shift the valve. The plunger D is then moved in the opposite direction by the water passing in behind it and carrying with it the plunger E the length of its stroke, after which the plunger E makes a stroke in the same direction. The plunger D having a greater area than the plunger E when working slowly, might commence a reverse movement before the plunger E had completed its stroke, causing a slight error in measurement. To prevent this, latches $m$ are provided which catch over the flanges and hold the plunger D at the end of each stroke until the plunger E has completed its stroke and caused the sliding rod to open the latch at the end of the stroke.

In the above described construction of meter no water can possibly pass out of the meter without moving one of the plungers and being measured, and there is no position in which the plunger can be placed that will prevent the water from flowing.

Having thus described my invention, what I claim as new, and desire to secure by Letters Patent, is—

1. The combination of the two plungers E D, fitted to work one within and independent of the other, the outer plunger acting as a cylinder into which the water passes to actuate the first and to be measured with the compartments B B' B'', and passages I I and $ff$, arranged and operating substantially in the manner described.

2. The latches $m$, in combination with the plunger D, flanges $a\, a$, and tappets $k\,k$, when arranged and operating in the manner and for the purposes described.

BENJ. S. CHURCH.

Witnesses:
RICHARDSON GAWLEY,
JAMES LAIRD.